US006885374B2

(12) United States Patent
Doyle et al.

(10) Patent No.: US 6,885,374 B2
(45) Date of Patent: Apr. 26, 2005

(54) APPARATUS, METHOD AND SYSTEM WITH A GRAPHICS-RENDERING ENGINE HAVING A TIME ALLOCATOR

(75) Inventors: Peter L. Doyle, El Dorado Hills, CA (US); Aditya Sreenivas, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 348 days.

(21) Appl. No.: 09/895,529

(22) Filed: Jun. 29, 2001

(65) Prior Publication Data

US 2003/0001847 A1 Jan. 2, 2003

(51) Int. Cl.[7] ............................................. G06F 15/80
(52) U.S. Cl. ...................... 345/505; 345/522; 345/536
(58) Field of Search ................................ 345/505, 679, 345/558, 506, 522, 552, 502, 536, 553, 520; 708/653; 709/232, 107, 108, 100, 244, 224; 710/65, 23; 712/242, 206; 711/136, 207, 100, 113, 118, 120, 123, 128

(56) References Cited

U.S. PATENT DOCUMENTS

| 5,339,443 | A |   | 8/1994  | Lockwood          |         |
|-----------|---|---|---------|-------------------|---------|
| 5,455,958 | A | * | 10/1995 | Flurry et al.     | 710/65  |
| 5,600,837 | A |   | 2/1997  | Artieri           |         |
| 5,644,407 | A |   | 7/1997  | Watanabe et al.   |         |
| 5,703,806 | A |   | 12/1997 | Puar et al.       |         |
| 5,870,102 | A |   | 2/1999  | Tarolli et al.    |         |
| 5,880,737 | A |   | 3/1999  | Griffin et al.    |         |
| 5,940,086 | A |   | 8/1999  | Rentschler et al. |         |
| 5,969,726 | A |   | 10/1999 | Rentschler et al. |         |
| 6,092,124 | A |   | 7/2000  | Priem et al.      |         |
| 6,124,868 | A |   | 9/2000  | Asaro et al.      |         |
| 6,157,393 | A |   | 12/2000 | Potter et al.     |         |
| 6,184,903 | B1|   | 2/2001  | Omori             |         |
| 6,188,381 | B1|   | 2/2001  | van der Wal et al.|         |
| 6,252,600 | B1|   | 6/2001  | Kohli et al.      |         |
| 6,252,610 | B1|   | 6/2001  | Hussain           |         |
| 6,311,204 | B1| * | 10/2001 | Mills             | 709/100 |
| 6,339,427 | B1| * | 1/2002  | Laksono et al.    | 345/553 |
| 6,362,828 | B1|   | 3/2002  | Morgan            |         |
| 6,392,655 | B1|   | 5/2002  | Migdal            |         |

FOREIGN PATENT DOCUMENTS

| EP | 0 817 160 A2   | 1/1998 |
| WO | WO 00/04527    | 1/2000 |
| WO | WO 01/41069 A1 | 6/2001 |

OTHER PUBLICATIONS

U.S. Appl. No. 09/470,538, Sreenivas.
U.S. Appl. No. 09/609,274, Leung.
PCT International Search Report, International Application No. PCT/US 02/20682, 2 pgs. total.
PCT International Search Report, International Application No. PCT/US 02/20781, 2 pgs. total.
"Intel® 810 E Chipset" product brief, developer.intel.com, Copyright © 1999 Intel Corporation, pp. 2 pgs. total. Published/sold prior to this application's file date.
"Intel® Graphics VBIOS, 5.1 Production version Release Notes", Revision History Jul. 31, 2000, Copyright © 1999–2000 Intel Corporation, pp. 1–4. Published/sold prior to this application's file date.

* cited by examiner

*Primary Examiner*—Matthew C. Bella
*Assistant Examiner*—Dalip K. Singh
(74) *Attorney, Agent, or Firm*—Blakely, Sokoloff, Taylor & Zafman LLP

(57) ABSTRACT

A method, apparatus, and system to concurrently render independent images for display on one or more display devices. In an embodiment, a graphics-rendering engine concurrently renders independent images for display on multiple display devices. A time allocator arbitrates the concurrent use of the graphics-rendering engine between each independent image being rendered.

31 Claims, 6 Drawing Sheets

APPARATUS, METHOD AND SYSTEM WITH A GRAPHICS-RENDERING ENGINE HAVING A TIME ALLOCATOR

FIELD OF THE INVENTION

This invention generally relates to rendering multiple images. More particularly this invention relates to rendering multiple images on one or more display devices.

BACKGROUND OF THE INVENTION

Image rendering is the conversion of a high-level object-based description into a graphical image for display on some display device. For example, an act of image rendering occurs during the conversion of a mathematical model of a three-dimensional object or scene into a bitmap image. Another example of image rendering is converting an HTML document into an image for display on a computer monitor. Typically, a hardware device referred to as a graphics-rendering engine accelerates these graphics processing tasks.

Multiple images may be commonly viewed on a computer monitor when surfing the Internet. For example, a web page and two banner ads super imposed over the web page may be displayed on a computer monitor when surfing the Internet. The graphics-rendering engine typically renders all of the instructions associated with the first image, such as the web page. After completing processing the instructions for the first image, the graphics-rendering engine starts processing the instructions associated with the second image, such as one of the banner ads. However, in general, the graphics-rendering engine must finish rendering the instructions associated with the first image before starting to process the instructions associated with the second image. Thus, if the graphics-rendering engine processes instructions faster than the graphics application program generates instructions, then the graphics-rendering engine remains idle during that period of time. Also, if the image instructions call for a real world event to occur prior to executing the next instruction, then the graphics-rendering engine remains idle during that period of time. Typically, a graphics-rendering engine services instruction streams sequentially. Thus, the instructions associated with the first instruction stream were processed before the graphics-rendering engine started processing instructions associated with a second instruction stream.

Another example could be the rendering of two independent images in a three dimension environment. A single display screen displays a first window that contains the 3D image and a second window that contains the displayed image of a controlling 2D graphic user interface. As noted, in previous technologies, the instructions for the image in the first window were processed before the graphics-rendering engine started processing instructions the image in the second window.

Previous technologies have displayed multiple images on multiple devices. Typically, two or more graphics-rendering engines exist to process the instructions associated with the multiple images. Each graphics-rendering engine services a single display device. However, in practice, multiple graphics-rendering engines occupy more physical space, consume more power, and cost more to produce than a single graphics-rendering engine. Thus, reducing the number of graphics-rendering engines is beneficial. Moreover, previous technologies attempting to render different images on the same display screen with two or more graphics-rendering engines encountered grave arbitration conflicts.

Each graphics-rendering engine is controlled via a set of rendering state variables. These state variables are known collectively as the rendering context. The rendering state variables control specific aspects of the graphics rendering process, such as object color, texture, texture application modes, etc.

A specific rendering context exists with each image as that image is being rendered. Previous technologies use an inefficient method to set the rendering context associated with an image. The graphics driver program receives instructions from the application programs and sends the instruction streams containing the instructions, including the state variable settings currently associated with the image, to the graphics-rendering engine. The graphics-rendering engine processes these rendering context instructions prior to executing the other rendering instructions. When a graphics-rendering engine switches between processing instructions associated with a first image and instructions associated with a second image, then the graphics application programs needs to send the rendering context instructions and the graphics-rendering engine needs to process those rendering context instructions.

Previously, the rendering context associated with a graphics-rendering engine was modified only via the software-generated instruction stream, and was not directly accessible from the host CPU. Changing from a first rendering context, such as the current rendering context, to a second rendering context, such as a new rendering context, therefore required the application software to generate instructions to specify the state variable settings for the second rendering context. Given that the first rendering context could not be read, application software was required to maintain a shadow copy of the first rendering context in order to restore that first rendering context at some later point.

BRIEF DESCRIPTION OF THE DRAWINGS

The drawings refer to the invention in which.

Figure 1:
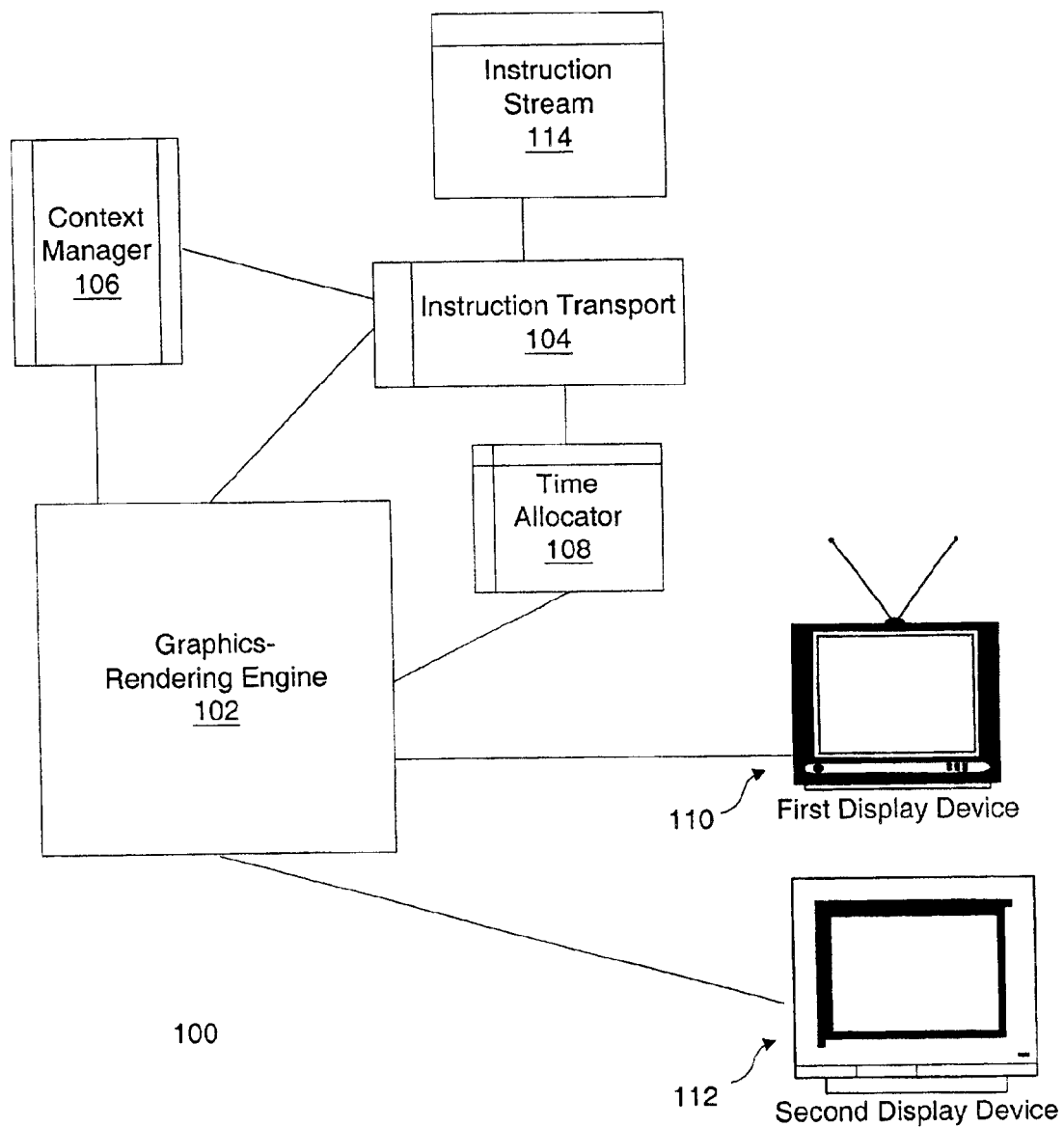
FIG. 1 illustrates a block diagram of an embodiment of a graphics device that renders one or more images using a single graphics-rendering engine to display the one or more images on multiple display devices.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific instructions, named components, connections, etc. in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention. The term coupled is defined as meaning connected either directly or indirectly.

In general, a graphics-rendering engine concurrently renders independent images for display on multiple display devices. An instruction transport delivers instructions for the two or more independent images to the graphics-rendering engine. A time allocator arbitrates the concurrent use of the graphics-rendering engine between each independent image being rendered. A graphics context manager restores a rendering context associated with a first independent image from an established memory location to the graphics-rendering engine.

FIG. 1 illustrates a block diagram of an embodiment of a graphics device that renders one or more images using a graphics-rendering engine to display the one or more images on multiple display devices. Referring to FIG. 1, the graphics device 100 contains a graphics-rendering engine 102, one or more instruction transports 104, a context manager 106, a time allocator 108, and one or more display devices, such as the first display device 110 and the second display device 112. In an embodiment, the graphics device 100 contains a single graphics-rendering engine 102.

The graphics-rendering engine 102 generates independent images to be displayed on either a single display device or multiple display devices. Thus, for example, two independent images may be displayed on the same display device or the two independent images may each be displayed on separate display devices. The instructions for each independent image come from a separate instruction stream 114 or from a single instruction stream 114 containing instructions from multiple graphic application programs.

Each independent image may be concurrently rendered as compared to prior art technology displaying a web page with banner ads through a browser application or sequentially rendering a first instruction stream associated with a two dimensional image and then rendering a second instruction stream associated with a three dimension image. Generally, the prior art technology completely renders the image instructions associated with the first image contained in the first window, such as the banner ad, and then completely renders the instructions for the second image contained in the second window, such as the web page. Typically, the prior technology, the graphics-rendering engine does not concurrently operate on the instructions for each independent image.

The time allocator 108 arbitrates the use of the graphics-rendering engine 102 between each independent image being rendered. A graphics context manager 106 stores the context associated with each independent image being rendered in a memory device (not shown). Various graphic's applications running on the processor or running on a browser running on the processor insert image rendering instructions into the instruction stream 114. An instruction transport 104 delivers the instructions from an instruction stream 114 to the graphic-rendering engine 102 or processing.

The graphics-rendering engine 102 works with the graphics context manager 106, time allocator 108, and one or more instruction transports 104 to make efficient use of the graphics-rendering engine 102. Each graphics application supplying instructions to the instruction stream 114 may be generating images and operating at different rates of speed. For example, a streaming live video application usually operates at much faster image generation rate than a word processing application. The graphics-rendering engine 102 may concurrently render instructions associated with two or more images to minimize the time the graphics-rendering engine 102 remains, idle. Also, in previous technologies if the instruction for a first image called for a real word event to occur prior to executing the next instruction, then the graphics-rendering engine 102 remained idle during that period of time. However, the graphics-rendering engine 102 may concurrently render instructions from multiple images in order to reduce the idle time for the graphics-rendering engine 102.

The graphics-rendering engine 102 may save the current rendering context associated with a first image and load a new rendering context associated with a second image from established memory location (not shown). In an embodiment, the established memory location used to store a rendering context may be referred to as a logical context (not shown). The graphics-rendering device 100, when required to switch rendering contexts, may (1) write the current rendering context from the rendering state variables into a first established memory location in memory, (2) read the new rendering context from a second established memory location in memory, and (3) load the rendering state variables with the information from the new rendering context. In an embodiment, an established memory location in the context manger 106 is associated with each graphics application that is generating an independent image. In an embodiment, a separate instruction transport 104 is associated with each display device 110, 112 to store the independent set of image rendering instructions to be processed for that particular display device 110, 112.

Figure 2:
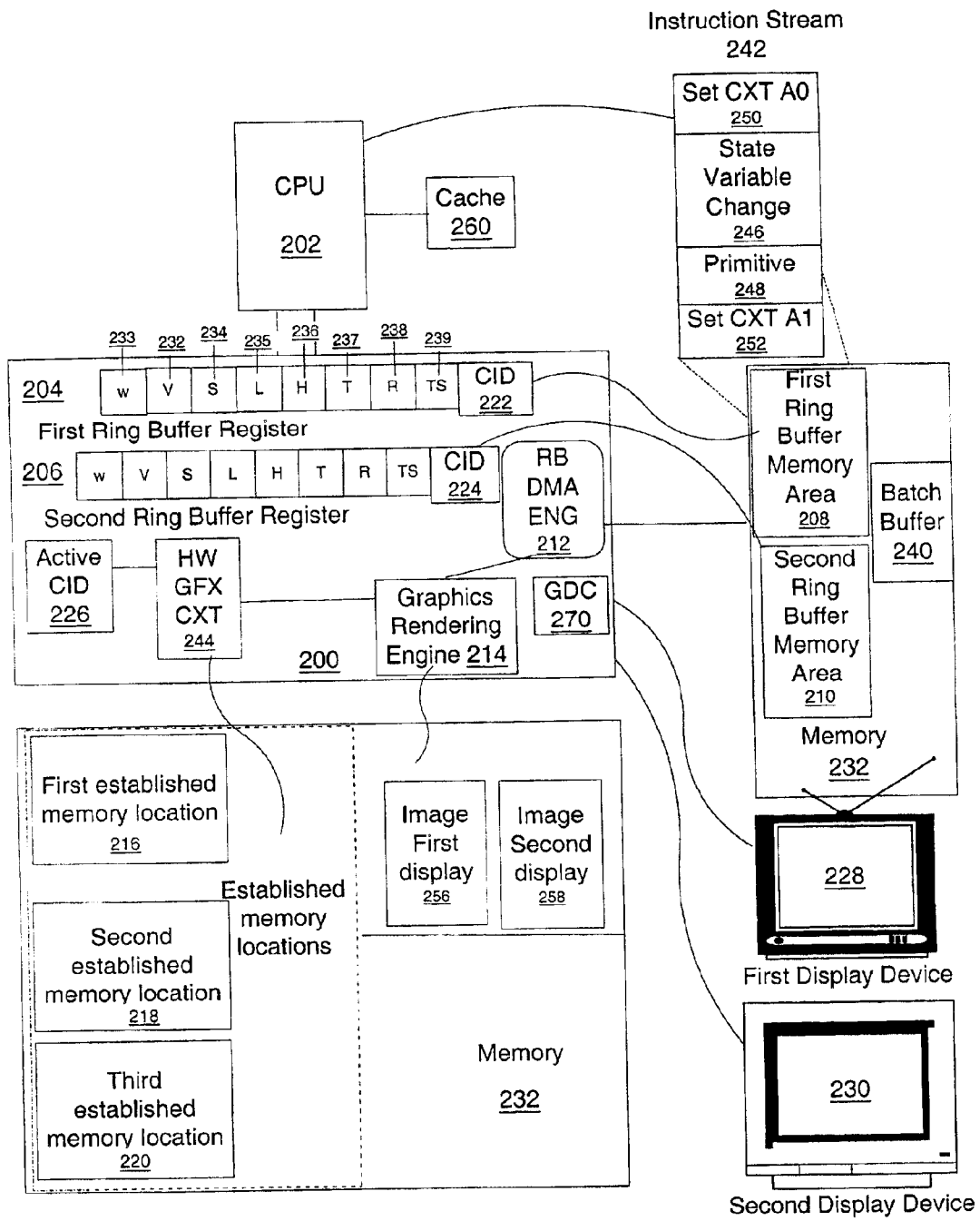
FIG. 2 illustrates a block diagram of an embodiment of a computer system containing a central processing unit (CPU), a cache, a memory, display devices, and a graphics device having an embodiment of an instruction transport and an embodiment of a graphics context manager.

FIG. 2 illustrates a block diagram of an embodiment of a computer system containing a central processing unit (CPU), a cache, a memory, display devices, and a graphics device having an embodiment of an instruction transport and an embodiment of a graphics context manager. The graphics device 200 contains multiple ring buffer registers 204, 206, a ring buffer direct memory access engine (RB DMA ENG) 212, a graphics-rendering engine 214, and context identification registers (CID) 222, 224. Multiple ring buffer memory areas 208, 210, multiple established memory locations 216, 218, 220 and multiple display devices 228, 230 are associated with the graphics device 200. In an embodiment, an instruction transport includes multiple ring buffer registers 204, 206, multiple ring buffer memory areas 208, 210 and a direct memory access engine 212. In an embodiment, a context manager consists of context identification registers (CID) 222, 224, an active context identification register (Active CID) 226, and multiple established memory locations 216, 218, 220.

Figure 3:
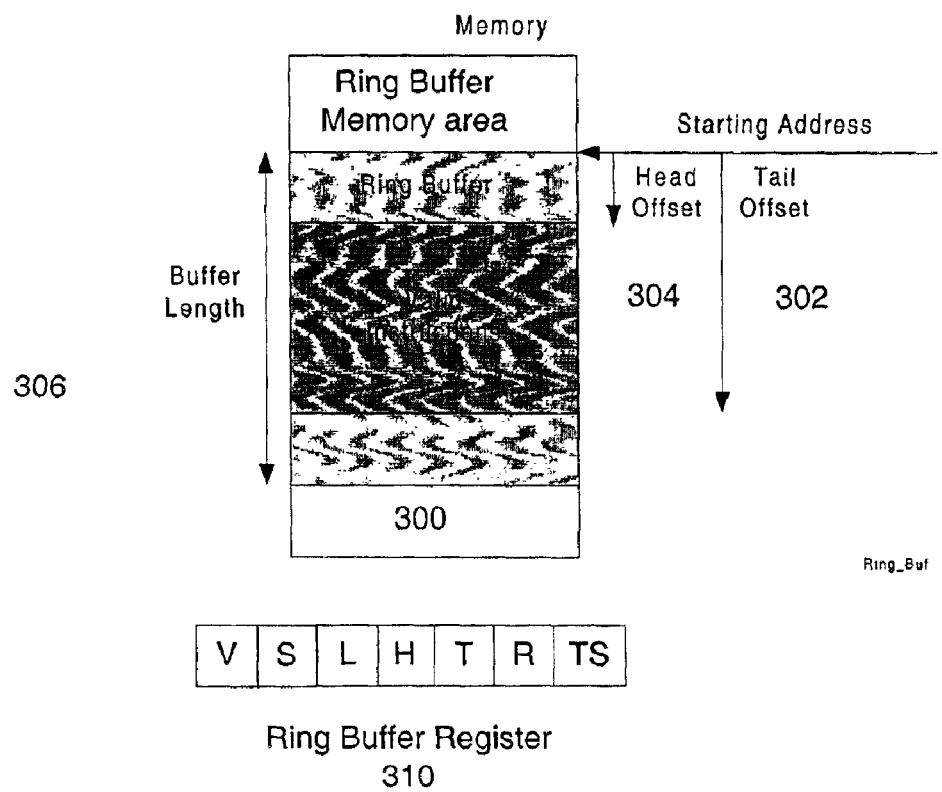
FIG. 3 illustrates a block diagram of an embodiment of a ring buffer memory area.

FIG. 3 illustrates a block diagram of an embodiment of a ring buffer memory area. As noted above, an embodiment of the instruction transport contains one or more ring buffer registers 310 and one or more ring buffer memory areas 300 through which software-generated instructions can be passed to the graphics-rendering engine (not shown). A ring buffer memory area 300 holds the actual image rendering instructions from a graphics application (not shown). The ring buffer register 310 defines the start and length of the ring buffer memory area 300, and includes two "offsets", a head 304 and tail 302, into the ring buffer memory area 300. The tail offset 302 informs the graphics-rendering engine of the presence of valid instructions that must be executed. The head offset 304 is incremented by the graphics-rendering engine as those instructions are parsed and executed. Instructions can wrap around from the bottom of the ring buffer memory area 300 back to the top of the ring buffer memory area 300. In an embodiment, the ring buffer memory area 300 stores an instruction to point to the location of a batch buffer (not shown). The batch buffer contains a separate list of image rendering instructions that may be stored in a discrete memory area to provide extra instruction storage capacity. In an embodiment, the batch buffer stores an independent sequence of instructions that can be invoked from an instruction stream.

Referring back to FIG. 2, each ring buffer register 204, 206 may have multiple fields within the register. The fields contained within an embodiment of a ring buffer register, such as the first ring buffer register 204, may be a ring buffer valid field (V) 232, a start address field (S) 234, a buffer length field (L) 235, a head offset field (H) 236, a head wrap count field (W) 233, a tail offset field (T) 237, an automatic report head enable field (R) 238, a time slice field (TS) 239 and other similar fields.

The ring buffer valid field 232 controls whether this particular ring buffer register is included in the arbitration process for sharing the graphics-rendering engine 214. The start address field 234 points to the start of a contiguous memory region comprising the ring buffer memory area 208, 210. A ring buffer memory area 208, 210 located in either the system memory 232 or a dedicated memory. The buffer length field 235 specifies the size in bytes of the allocated ring buffer memory area 208, 210. In an embodiment, the ring buffer length field 235 defines the largest amount of data that can be submitted at any one time to a ring buffer memory area 208, 210. In an embodiment, the ring buffer memory area 208, 210 may contain image rendering instructions and pointers to one or more batch buffers 240, thereby, making a virtually limitless memory area to contain instructions.

The head offset field 236 points to the memory offset from start address 234 of the next instruction that the graphics-rendering engine 214 will parse. For example the head offset 236 may point to one memory unit past the last instruction parsed. The graphics-rendering engine 214 updates the head offset field 236 as instructions are parsed. Once the head offset 236 reaches the value of the tail offset 237, i.e. the offsets are equal, then the graphics-rendering engine 214 considers the ring buffer memory area 208, 210 empty and removes the corresponding ring buffer register 204, 206 from the arbitration process for sharing the graphics-rendering engine 214 as long as that condition remains. Thus, an indication exists that the instruction stream for that particular display device should be removed from the central process. Also, included in the ring buffer registers 204, 206 is an automatic report head enable field that enables the head pointer value and the head wrap count field 233 to be written to cacheable memory for more efficient flow control algorithms. For example, flow control algorithms during polling the head offset 236 to ascertain progress.

The ring buffer memory area 208, 210, may wrap instructions from the end of the memory area to the start of the memory area. The head wrap count field 233 is incremented by the graphics-rendering engine 214 every time the head offset 236 wraps around back to the start address 234 of the ring buffer memory area 208, 210. In an embodiment, the head wrap count field 233 is included in the DWord written in the "report head" process. The graphics device 200 can use the head wrap count field 233 to track the instruction parsing progress as if the ring buffer memory area 208, 210 has a "virtual" length much greater than the size of the actual physical buffer.

The tail offset field 237 points to a location in the ring buffer memory area 208, 210 that is offset a specific distance from start address 234. The tail-offset field 237 may point to the next memory unit of instruction data that graphics application software can use to store additional image rendering instructions to be later executed. For example, the tail offset field 237 points one memory unit 232 past the last instruction submitted to the graphics-rendering engine 214 for execution. The instructions submitted can wrap around from the end of the ring buffer memory area 208, 210 back to the top, in which case the tail offset 237 written will be less than the previous value. The "empty" condition of a ring buffer memory area 208, 210 may be defined as "head offset field 236 equals the tail offset field 237."

The automatic report head enable field 238 allows graphics application software or operating software to request to have the head offset field 236 and head wrap count field 233 contents to be written to a specific, (CPU-snooped system memory location on a periodic basis. Auto-reports can be programmed to occur each time the head offset field 236 advances by a programmed amount. The auto-report mechanism allows software to use the head offset field 236 head wrap count field 233 to determine the amount of free space in the ring buffer. Thus, the head offset field 236 may be periodically reported to the system memory to provide a fairly up-to-date, head offset field 236 value automatically, without having to explicitly obtain a head pointer value via an instruction.

Each display device 228, 230 may have a separate instruction transport associated with that individual display device. As illustrated in FIG. 2, the first ring buffer register 204 and the first ring buffer memory area 208 are associated with the first display device 228. The second ring buffer register 206 and the second ring buffer memory area 210 are associated with the second display device 230. Thus, in this example, the first ring buffer register 204 and first ring buffer memory 208 area provide the instructions for the rendering of the independent image to be displayed on the first display device 228. In an embodiment, the first ring buffer register 204 and first ring buffer memory area 208 may be associated with the second display device 230.

Multiple instruction transports allow different priorities to be assigned to each instruction transport. For example, lower priority instruction transports can be used for interruptible background rendering tasks. Likewise, a higher priority instruction transport can be used to service asynchronous events, such as video frame capture. Also, by allocating a first instruction transport to service one display device, such as the first display 228, and a second instruction transport to service another display device, such as the second display device 230, the graphics device 200 can support separate instruction streams per display device. Further, the graphics device 200 can support separately controlled instruction streams per display device.

As noted above, each instruction transport may include a direct memory access engine 212. The direct memory access engine 212 fetches instructions from a particular instruction transport and delivers these instructions to the graphics-rendering engine 214.

The graphics-rendering engine 214 reads image instructions from the instruction transport via the direct memory access engine 212 and executes these image instructions. The graphics-rendering engine 214 detects the presence of instructions within the ring buffer memory areas 208, 210 via the difference between head offset field 236 and tail offset field 237 in the ring buffer register 204, 206. The graphics-rendering engine 214 interprets and decodes the common "Header" field of instructions in order to determine what information the instruction contains and therefore how to further execute the instruction. This interpretation and decoding of instructions is commonly referred to as parsing.

In an embodiment, the graphics-rendering engine 214 decodes specific instructions from the instruction stream 242 to find out to find out what information the instruction contains (e.g., a state variable change 246 to apply or a primitive 248 to be rendered). The graphics-rendering engine 214 then executes the instruction accordingly. The execution of state variable change instruction 246 causes a specific change to the current rendering context. The execution of a primitive instruction 248 causes modification of the appropriate image information in memory 256, 258 (i.e., the image is rendered). The graphics-rendering engine 214 then stores the image information in memory locations corresponding to each display device 228, 230, such the first display image 256 and the second display image 258. In an embodiment, the information for the first display image 256 and the information for the second display image 258 are stored in a local memory dedicated to both the first display device 228 and the second display device 230. In an embodiment, the instructions for the first display image 256 and the instructions for the second display image 258 are stored in the system memory 232. The graphics-rendering engine 214 reads the rendered image information from memory and present the rendered image information to the associated display device on a periodic basis. The display device, such as the first display device 228, then illustrates the actual images on a display based upon this information.

In an embodiment, the graphics applications supply instructions into the instruction stream 242. As noted, these instructions may be stored in a ring buffer memory area 208, 210 which is usually associated with a particular display device 228, 230. In an embodiment, some of the types of instructions found in the instruction stream 242 may be a state variable change 246, a primitive 248, and a set context commands 250, 252. A primitive instruction 248 directs the graphics-rendering engine 214 as to the shapes to draw and the location and dimensions to attribute to those shapes. The state variable change instruction 246 directs the graphics-rendering engine 214 to modify the current values of the set of rendering state variables stored in the hardware graphics context circuit 244 when rendering an image. In an embodiment, the set context command (Set CXT #) 250, 252 may cause the graphics-rendering engine 214 to save the current rendering context to an established memory location, such as the first established memory location 216, and restore the new rendering context from a new established memory location, such as a second established memory location 218.

Each established memory location, such as the first established memory location 216, stores the rendering context of an image being rendered by the graphics-rendering engine 214. Likewise, each established memory location 216 218, 220 may store the settings of the rendering state variables to be employed when rendering the associated independent image. In an embodiment, the existence of multiple established memory locations 216, 218, 220 allows the graphic-rendering engine 214 to keep track of the rendering context associated with each image being rendered. An embodiment of a context manager contains multiple established memory locations 216, 218, 220 and context identification registers 222, 224, 226 in order to manage the concurrent rendering of multiple images. An embodiment of a context manager coordinates with a graphics display controller circuit (GDC) 270 to support displaying images on multiple display devices 228, 230 as well as displaying multiple images on the same display device, such as the first display device 228.

The settings of numerous hardware state variables in the hardware graphics context circuit 244 control the graphics operations, such as rendering, in the graphics device 200. The state variables may include global state variables and context state variables. Global state variables are common to all contexts (e.g., logical address mapping resources, etc.) and are therefore considered outside the scope of any specific rendering context. However, each rendering context associated with a specific graphics application does contain a separate set of context state variables. In an embodiment, these rendering contexts associated with a specific graphics application may be stored in established memory locations on active on-chip memory or in multiple established memory locations 216, 218, 220 in system memory 232.

As noted, the multiple established memory locations 216, 218, 220 support the graphics-rendering engine 214 by storing in a memory 232 and restoring from the memory 232 the rendering context associated with the independent image being rendered by the graphics-rendering image. In an embodiment, a second set context instruction from the instruction stream 242, such as set context-A0 250, directs the graphics-rendering engine 214 to send the current rendering context for the image being rendered to an established memory location, such as the first established memory location 216, for storage. At the same time, the second established memory location 218 associated with the graphics application generating the second image receives a signal from the graphics-rendering engine 214 to restore the rendering context associated with a second image being concurrently rendered by the graphics-rendering engine 214. In an embodiment, the addition of a context cache 260 located on the device reduces the memory bandwidth and time required to swap contexts.

The context manager also consists of context identification registers (CID) 222, 224, and an active context identification register 226. Context identification registers 222, 224 associate with a particular ring buffer register 204, 206 and thus a particular display image memory location 256, 258.

In an embodiment, the active context identification register 226 tracks the context identification register 222, 224 value contained within the currently active ring buffer register 204,206. The tracked context identification register, such as the first context identification register 222, establishes which particular established memory location 216, 218, 220 is associated with the image currently being rendered by the graphics rendering engine.

In an embodiment, each context identification register 222, 224, contains an established memory location address and a set of context qualifier bits. The context qualifier bits control whether portions of the rendering context either do or do not have to be saved/restored upon context switch. In an embodiment, each context identification register 222, 224, implements context qualifier bits such as, a "Texture Palette Save Disable" context qualifier bit and a "Texture Palette Restore Disable" context qualifier bit. In an embodiment, these context qualifier bits aid in the swapping of context between two dimensional and three dimensional images, where the three dimensional images may require a current Texture Palette to be maintained (i.e., saved and restored as part of the rendering context) while the two dimensional images may not.

Established memory locations 216, 218, 220 are referenced via the established memory location address of the corresponding context identification register 222, 224. The actual size of an established memory location 216, 218, 220 is the amount of data stored/restored during a context switch and depends on whether the rendering context includes a texture palette. In an embodiment, a context identification register 222, 224 may contain two additional registers to specify the respective established memory location 216, 218, 220 size in memory 232. In an embodiment, a particular context identification register 222, 224 is made the active register during the processing of a "set_context" instruction 250, 252 from the instruction stream 242 being stored in the corresponding ring buffer memory area 208, 210. In an embodiment, the set_context instruction 250, 252 provides a new context identification value (local context address+ palette save disable bits) to be loaded into the context identification register 222, 224. The set_context instruction 250, 252 also contains a restore inhibit bit used to optionally inhibit the restoration of the new context. In an embodiment, the restore inhibit bit may be used during context initialization to avoid the loading of uninitialized context data from memory 232.

The active context identification register 226 contains the context identification values of the active ring buffer register, such as the first ring buffer register 204. As part of the execution of the set_context instruction 250, 252, the established memory location address fields from the active context identification register 226 and set_context instruction are compared. If they differ or the active context identification register 226 is uninitialized, a context switch operation occurs.

In an embodiment, during the context switch operation, if a restore inhibit instruction field is not set, a context restore operation may be performed. Here, the address value for an established memory location, such as the first established memory location 216 is used to load the active context identification register 226. Note, that the context qualifier fields of the instruction may further condition the restoration of portions of the rendering context. For example, the texture palette may or may not be restored.

The HW GFX CXT 244 causes the load of the new context from the appropriate established memory location, as well as the loading of the active context identification register with the value from the set context instruction 250, 252. At this point, the corresponding ring buffer register 204, 206 and ring buffer memory area 208, 210 have switched the active context to the new established memory location 216, 218, 220.

As noted previously, each graphics application may be generating image instructions at different rates of speed. Equally true is that each display device 228, 230 may refresh the display and its associated image at different rates of speed. In an embodiment, the content manager and the instruction transport support the seamless switching between different instruction streams, switching between different display devices 228, 252, and switching between rendering contexts associated with different graphics applications within the same instruction stream 242.

Figure 4:
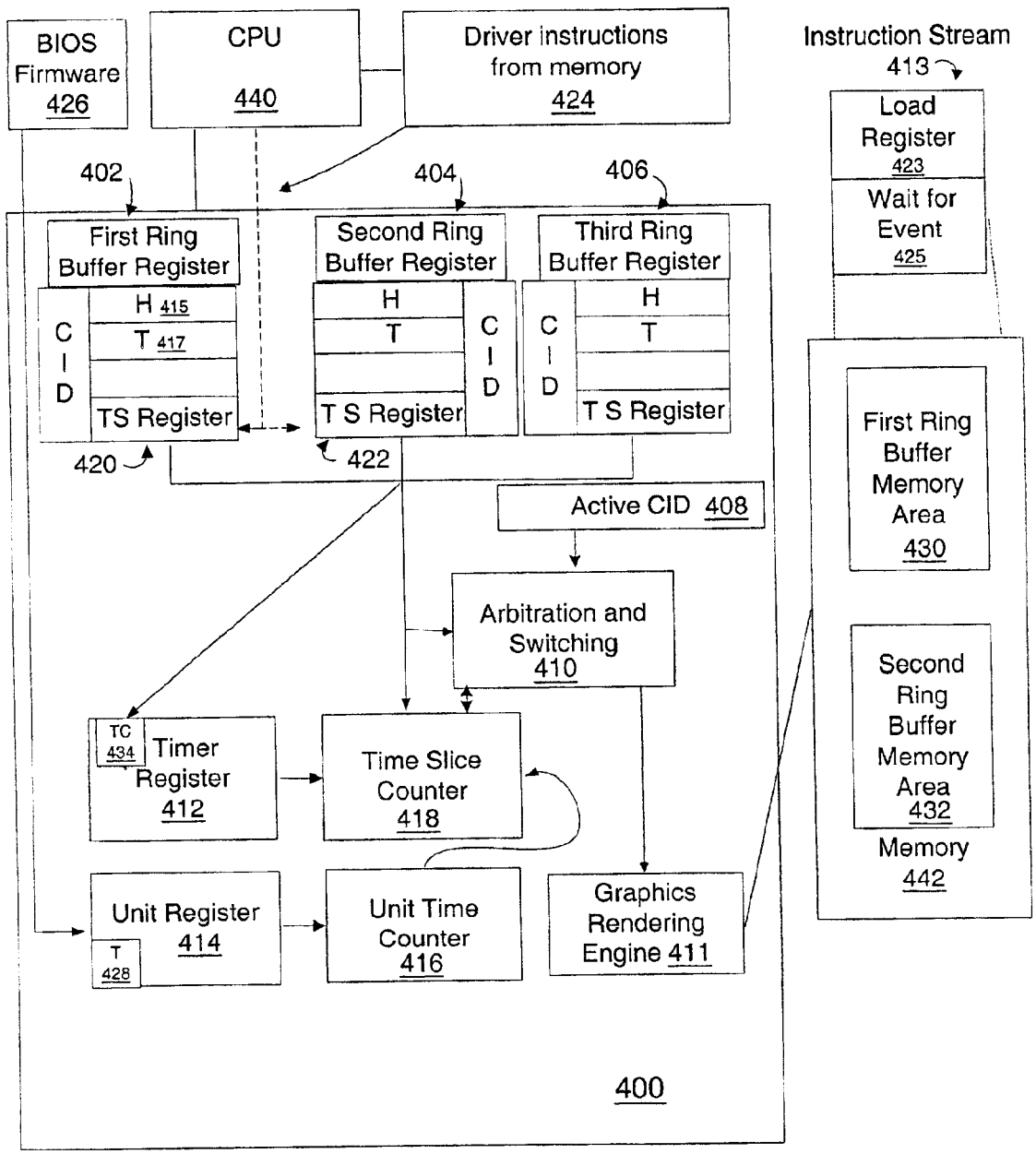
FIG. 4 illustrates a block diagram of an embodiment of a time allocator to allocate the use of the graphics-rendering engine between each independent image being rendered.

FIG. 4 illustrates a block diagram of an embodiment of a time allocator to allocate the use of the graphics-rendering engine between each independent image being rendered. In an embodiment, the time allocator 400 contains an arbitration and switching module 410, a timer register 412, a unit register 414, a unit-time counter 416 and a time slice counter 418. In an embodiment, the time allocator 400 provides an elapsed time criteria and fairness use criteria to allocate the use of the single graphic-rendering engine 411. In an embodiment, the time allocator 400 may allocate the use of the graphics-rendering engine 411 to render independent images between either multiple display devices (not shown), multiple graphic application programs each having its own instruction stream 413, and multiple graphics application programs within a single instruction stream 413.

Each ring buffer register, such as the first ring buffer register 402 and the second ring buffer register 404, may be time sliced or the ring buffer register may be non-time-sliced, such as the third ring buffer register 406. As will be described later, each non-time sliced register may be used for hi-priority graphic images, such as live video, to temporarily monopolize the use of the graphics-rendering engine 411.

Each time-sliced ring buffer register 402, 404 has associated with it a TIME_SLICE register 420, 422 that specifies the desired duration of instruction execution to be performed before indicating that a switch to another time-sliced ring buffer should be checked. In an embodiment, a time slice field 420, 422 in the ring buffer register 402, 404 exists to specify a percent of use of the graphics-rendering engine 411 that should be accorded to this particular ring buffer register 402, 404. The time slice field 420, 422 may also specify the minimum absolute time use of the graphics-rendering engine 411 that should be accorded to this ring buffer register 402, 404. In an embodiment, the desired duration of instruction execution may be programmed in time units. In an embodiment, the driver software 424 may write these time unit values into each time slice field 420, 422. Thus, the driver software 424 is able to control both the absolute and relative time devoted to each time-sliced ring buffer register 420, 422. The CPU 440 accesses the driver software 424 from a memory, such as memory 442, The unit register 414 provides a forward-compatible unit-time time quanta to be used by driver software 424. Establishing a unit-time quanta is important where the actual time reference of the device may vary between configurations and/or implementations. In an embodiment, the unit register 414 uses the graphic device's 400 core clock period as the actual time reference. The unit register 414 may be programmed via the BIOS firmware 426 for the graphic device 400. The other time slice parameters may be defined relative to this unit-time quanta established by the unit register 414. Each unit-time quota defined by unit register 414 may be, for example one unit-time equals fifty microseconds or one unit-time equals forty clock cycles.

The unit register 414 also contains a time-slice enable bit (T) 428 to turn ring buffer time slicing on or off. In an embodiment, when the time-slice enable bit 428 of the unit register 414 is clear, fixed ring buffer priorities are in effect. In an embodiment, when the time-slice enable bit 428 is set, arbitration between the time sliced ring buffer registers 401, 404 is controlled via the time slice fields 420, 422.

A timer register 412 implements the time slice timing control. When the time-slice enable bit 428 is set, the time register 412 reads the value in units written into the time slice fields 420, 422 portion of each ring buffer registers 402, 404. In this mode, the activation or resumption of an instruction-stream 413 supplying instructions to a specific ring buffer memory area, such as the first ring buffer memory area 430, causes the timer countdown field (TC) 434 to be initialized with the content value in the time slice register 420, 422 portion of that specific ring buffer, such as the first ring buffer register 420. The timer countdown field 434 decrements every time-unit while the execution of the instructions from the ring buffer memory area continues.

The time slice counter 418 decrements the timer countdown field 434 every time unit. The unit time counter 416 monitors and counts every core clock cycle. The unit time counter 416 sends a signal to the time slice counter 418 to decrement the timer countdown field 434 based upon the established unit time quota defined by unit register 414.

In an embodiment, if the following two conditions exist then the graphics-rendering engine 411 receives an instruction from the arbitration and switching module 410 to stop rendering the instructions from a ring buffer memory area and start rendering instructions from another ring buffer memory area. The two conditions are if the timer countdown field 434 becomes zero, and pending instructions exist in the other ring buffer memory area. The graphics-rendering engine 411 then switches to executing the other ring buffer memory area, such as the second ring buffer memory area 432, which causes the timer countdown field 434 to be reinitialized with the contents in time slice field 422 in the second ring buffer register 404. The switch occurs at the next instruction arbitration point.

However, if there are no pending instructions in the other ring buffer memory areas, such as the first ring buffer memory area 430, when the timer countdown field 434 becomes zero, then execution of the instruction in the current ring buffer memory area continues. In an embodiment, the execution of the instructions in the current ring buffer memory area continues indefinitely until when the other ring buffer register communicates the presence of instructions. In an embodiment, a ring buffer register, such as the first ring buffer register 402 indicates the presence of instructions to execute when the value in the head offset field 415 differs form the value of the tail offset value 417. In an embodiment, the presence of the new instructions is communicated to the arbitration and switching module 410. The arbitration and switching module continues the execution of the instructions in the current ring buffer memory area for the value specified in the time slice field 402, 422 and then switches to executing the new instructions.

The active context identification register communicates to the graphics-rendering engine 411 via the arbitration and switching module 410 the context identification register values of the active ring buffer register (not shown).

Several mechanisms can interrupt the arbitration process for use of the graphics-rendering engine 411 between two ring buffer registers having pending instructions stored in their respective ring buffer memory areas. As noted above, a non-time slicing high priority ring buffer, such as the third ring buffer register 406, may communicate to the arbitration and switching module 410 to suspend the timer countdown 434 and rendering of instructions for the currently active time-sliced ring buffer register. This suspension is only temporary until the graphics rendering engine 411 finishes rendering the current instructions associated with the non-time sliced ring buffers.

The instruction stream 413 from the graphics application software may contain instructions to temporarily interrupt the arbitrated use of the graphics-rendering engine 411. For example, a "load register" instruction 423 may interrupt the arbitration use of the graphics rendering engine 411 between two time-sliced ring buffer registers 402, 422 having pending instructions stored in their respective ring buffer memory areas 430, 432. The software can use the "load register" instruction 423 to clear the timer countdown field 434 and, thus, effectively make the active ring buffer register give up the remainder of its time slice period if pending instructions exist in another ring buffer memory area. For example, the "load register" instruction 423 may be used when the time for the instructions being executed is not anticipated to exceed either the specified percent of use or the absolute minimum time accorded to the ring buffer register 402, 422. In an embodiment, if the instructions associated with a first stream do not take up the entire time slice period, then the arbitration and switching module 410 automatically switches to another a ring buffer memory area containing pending instructions. Also, for example, the "load register" instruction 423 may be used prior to an extremely time-consuming instruction or non-interruptable sequence of instruction to allow the pending instructions for a second application to be processed before the graphics rendering engine 411 operates on this particular sequence of instructions.

As noted, if there are no other ring buffer memory areas 430, 432 with instructions ready to execute, the execution of instructions continues past the "load register" instruction 423. If another ring buffer memory area 430, 432 does have instructions to execute, after the execution of the other ring buffer's instructions, then the graphics rendering engine 411 immediately switches back to the original ring buffer's instructions without waiting through a timer countdown 434.

The instruction stream 413 may also contain a "wait for event" instruction 425. The "wait for event" instruction 425 may be used to pause execution of instructions from this particular instruction-stream 413 until a certain condition exists or event happens. If execution of "wait for event" instruction 425 results in a pause, other time-sliced ring buffer registers 402, 404 are allowed to have the graphics-rendering engine process their associated instructions, even before the remainder of the paused ring buffer's time slice period is expired. For example, a "wait for event" instruction 425 may be used to wait for a video capture event. The display device must use those instructions to display the image when going from the top vertical position on the display screen to the low vertical position on the display screen. Thus, the graphics-rendering engine 411 has rendered all of the instructions for the complete image on the display screen and can not render any more instructions for that display device until transition period expires from the top vertical position to the low vertical position. During the time the graphics device 400 is waiting for such an event to occur, a "wait for event" instruction 425 permits the graphics-rendering engine 411 to re-enable the processing of another time-sliced ring buffer memory area associated with a different display device while waiting for that asynchronous event to occur for the current display device. An asynchronous event is an event that is not occurring at regular interval, or coordinated in time, such as a video capture event. In an embodiment, the asynchronous event occurs either randomly or at an interval unrelated to the instruction stream execution. For example, a display device's vertical blank event, an asynchronous event, actually occurs at a regular interval in real world time (i.e., 60 Hz), but is asynchronous to the irregular service time associated with the instruction stream 413 execution.

Figure 5:
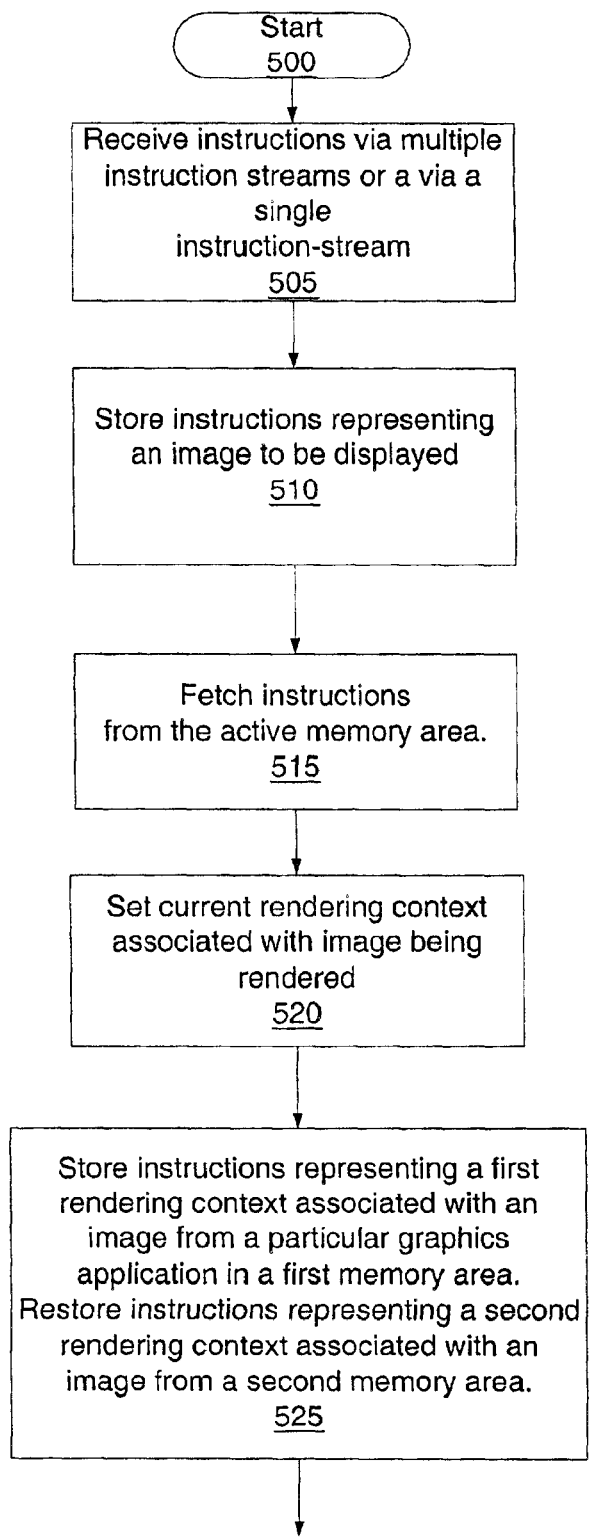
FIG. 5 and FIG. 6 illustrate a flow diagram of an embodiment of a process for rendering multiple images on multiple display devices using a single graphic-rendering engine.
Figure 6:
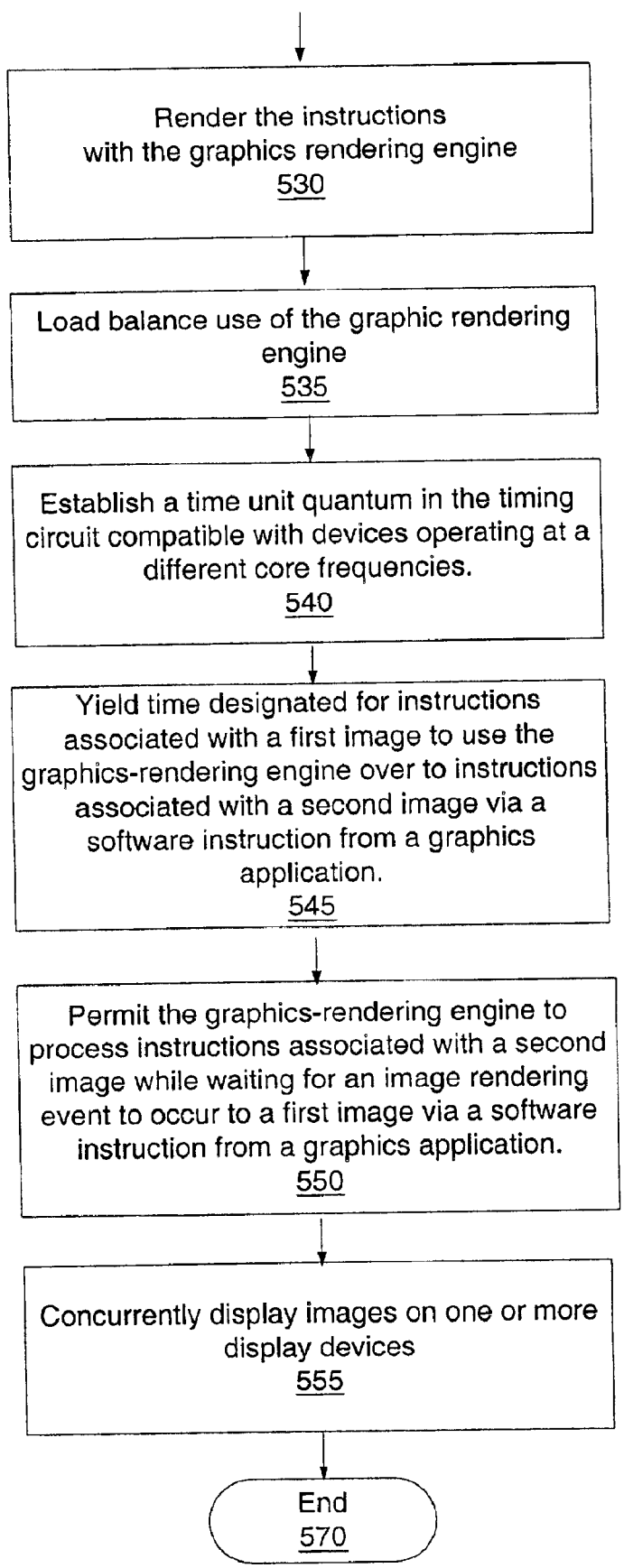

FIG. 5 and FIG. 6 illustrate a flow diagram of an embodiment of a process for rendering multiple images on multiple display devices using a single graphic-rendering engine. An instruction stream originates the process when the instruction stream carries instructions from one or more graphics applications to an instruction transport.

In block 505, a first ring buffer memory area defined by a ring buffer register receives instructions from multiple graphics application programs or via a single graphics application program. The location and size of the first ring buffer memory area may be defined by programmable content contained in a first ring buffer register. The instruction transport may contain one or more ring buffer memory areas or similar memory areas. The instruction transport may contain one or more ring buffer registers or similar devices.

In block 510, the driver stores the instructions representing the image in the first ring buffer memory area. In an embodiment, the Tail Offset field in the corresponding ring buffer register is changed by the driver to indicate the presence of these pending instructions contained in the first ring buffer memory area. The first ring buffer register communicates the presence of instructions to be executed to the graphics rendering engine and the arbitration and switching module.

In block 515, the instruction transport uses a DMA engine to fetch the instructions from the first ring buffer memory for the graphics-rendering engine. The arbitration and switching module sets the first ring buffer memory as the memory the graphics-rendering engine is processing instructions from.

In block 520, the graphics context manager sets the current rendering context associated with the first ring buffer register.

In block 525, in an embodiment, if the first (current) image that being processed by the graphics-rendering engine has a rendering context different than the second (next) image to be processed next then the following happens. The graphics context manager stores the rendering context associated with the first image and restores the context associated with the second image to the graphics-rendering engine. The graphics context manager stores and restores state variable values representing a rendering context associated with an image from a particular graphics application in a second memory area, such as an established memory location. The second memory area may be defined by programmable content contained in a second register, such as a context identification register.

In block 530, the graphics-rendering engine executes the instructions from the ring buffer memory area associated with a first display device, such as the first ring buffer memory area, and makes the appropriate modifications to the first image display memory area. Based upon the time allocator, the graphics-rendering engine may then start executing instructions from a second ring buffer memory area associated with a second display device. In an embodiment, the graphics-rendering engine may start executing instructions from a second graphics application contained within the same instruction stream supplying the first ring buffer memory area. Thus, the graphics-rendering engine may alternate between the processing of instructions associated with a first independent image and instructions associated with a second independent image by switching. The graphics-rendering engine may switch between processing instructions from different ring buffer memory areas or by processing instructions from two different graphics applications within the same instruction stream. Note, the graphics-rendering engine need not wait to completely process all of the instructions associated with the first independent image before starting to process instructions associated with the second independent image.

In block 535, the time allocator may load balance use of the graphic rendering engine between the instructions associated with first independent image and the second independent image. In an embodiment, the time allocator may load balance use of the graphics-rendering engine between the instructions associated with two or more independent images. In an embodiment, the time allocator balances the use of the graphics rendering engine based upon an percentage determined for each image and an absolute minimum time of usage of the graphics-rendering engine determined for each image. The time allocator may also balance the use of the graphics-rendering engine between high priority images demanding immediate use of the graphics-rendering engine and images sharing the percentage of use and absolute minimum time use of the graphics-rendering engine.

In block 540, the time allocator may establish a time-unit quantum in the timing circuit compatible with devices operating at a different core frequency. Note, these blocks are not indicative of any set sequential order of performance. For example, block 540 may occur before block 505.

In block 545, the time allocator may yield time designated for instructions associated with a first image to use the graphics-rendering engine over to instructions associated with a second image via a software instruction from the graphics device driver.

In block 550, the time allocator may permit the graphics-rendering engine to process instructions associated with a second image while waiting for an image-rendering event to occur to a first image via a software instruction from a graphics application.

In block 555, the graphic device concurrently displays images on one or more display devices.

In block 570, the graphics device continues this process started in block 505.

What is claimed is:

1. An apparatus, comprising:
   a graphics-rendering engine to concurrently render two or more independent images for display on multiple display devices; and
   a time allocator to arbitrate the use of the graphics-rendering engine between the two or more independent images, wherein the time allocator comprises a first circuit to permit a graphics device instruction from a graphics application to direct the graphics-rendering engine to process instructions associated with a second independent image while waiting far an asynchronous event to occur for a first independent image.

2. The apparatus of claim 1, wherein the time allocator comprises:
   a plurality of registers including a first register, the first register having a plurality of fields including a first field to determine whether the first register participates in an arbitration process to use the graphics rendering engine and a second field to point to a memory location containing instructions from a first instruction stream.

3. The apparatus of claim 2, wherein the time allocator further comprising:
   a first module to establish a programmable elapsed period of time to use the graphics-rendering engine.

4. The apparatus of claim 3, wherein the time allocator further comprises:
   a first circuit to generate a signal to check if a second register should be allowed to use the graphics-rendering engine after the first register uses the graphics-rendering engine for the programmable elapsed period of time.

5. The apparatus of claim 2, wherein the time allocator further comprises:

a first module to direct the graphics-rendering engine to process instructions associated with a first independent image, the instructions stored in a first memory area, the first memory area having an address defined by information contained within the plurality of the fields.

6. The apparatus of claim 5, wherein the first memory area has a start and an end, the first memory area may wraparound instructions from the end of the first memory area to the start of the first memory area.

7. The apparatus of claim 5, wherein the first module comprises:

a second circuit to track which register in the plurality of registers is currently being serviced by the graphics-rendering engine; and a third circuit to manage the use of the graphics-rendering engine between a second register which does not participate in the arbitration process and the first register and a third register which participate in the arbitration process.

8. The apparatus of claim 3, wherein the first module comprises:

a first circuit to track the period of elapsed time that a particular register uses the graphics-rendering engine; and a second circuit to convert the programmable elapsed period of time into an equivalent number of clock cycles.

9. The apparatus of claim 1, wherein the time allocator comprises:

a first circuit to implement a software instruction from a graphics application, the software instruction to yield time allotted for instructions associated with a first independent image to use the graphics-rendering engine over to instructions associated with a second independent image.

10. The apparatus of claim 1, further comprising:

a first display device and a second display device.

11. The apparatus of claim 1, further comprising:

a graphics context manager to restore information from a memory to the graphics-rendering engine, the information describing a rendering context associated with a first independent image to be rendered by the graphics-rendering engine, the first independent image being included in the two or more independent images.

12. The apparatus of claim 1, further comprising:

a first memory area to receive instructions for one or more independent images included in the two or more independent images, and a second memory area to receive instructions for one or more independent images included in the two or more independent images.

13. The apparatus of claim 1, further comprising;

One or more instruction transports to deliver instructions for the two or more independent images to the graphics-rendering engine, the one or more instruction transports including a first instruction transport.

14. The apparatus of claim 13, wherein each instruction transport is associated particular display device.

15. The apparatus of claim 13, wherein the first instruction transport comprises:

an instruction memory area;

a first register to define a start and an end to the instruction memory area; and a memory access engine to fetch and deliver the instructions from the instruction memory area to the graphics-rendering engine.

16. The apparatus of claim 13, wherein the instruction transport further comprises:

a third memory area to store an independent sequence of instructions that can be invoked from an instruction stream.

17. The apparatus of claim 15, wherein the first register contains a first field to instruct the graphics-rendering engine to write content contained in a second field to a snooped memory location on a periodic basis in order to automatically report an amount of free space available in the instruction memory area.

18. A method, comprising:

using a single graphics-rendering engine to execute instructions associated with a first instruction-stream;

concurrently rendering a first independent image via instructions associated with the first instruction-stream and a second independent image via instructions associated with a second instruction-stream by using the single graphics-rendering engine;

arbitrating the use of the single graphics-rendering engine between the instructions associated with the first instruction-stream and the instructions associated with the second instruction-stream with software instructions generated by a graphics application to direct the allocation of the graphics-rendering engine between the instructions associated with the first instruction-stream and the instructions associated with the second instruction-stream; and allocating the concurrent use of the single graphics-rendering engine between the instructions associated with the first instruction-stream and the instructions associated with the second instruction-stream by using a timing mechanism.

19. The method of claim 18, further comprising:

restoring information from a first memory address to the graphics-rendering engine, the information describing a first rendering context associated with the first independent image to be rendered by the single graphics-rendering engine, and storing the information describing a second rendering context associated with the second independent image to a second memory address, the second independent image being rendered by the single graphics-rendering engine.

20. The method of claim 18, further comprising:

displaying one or more images on the multiple display devices.

21. A method, comprising:

concurrently rendering independent images for display on multiple display devices with a graphics-rendering engine;

allocating time use of the graphics-rendering engine between each independent image being rendered;

permitting, via a software instruction from a graphics application, the graphics-rendering engine to process instructions associated with a second image while waiting for an asynchronous event to occur to a first image; and storing in a memory area and restoring from the memory area a first rendering context associated with a first independent image.

22. The method of claim 21, further comprising:

determining whether a first register associated with a first independent image participates in an arbitration process to use the graphics-rendering engine.

23. The method of claim 22, further comprising:

yielding time allotted to use the graphics-rendering engine for instructions associated with the first independent image over to instructions associated with a second independent image via a software instruction from a graphics application.

24. The method of claim 21, further comprising:

defining the memory area by programmable content contained in a first register, the memory area dedicated to storing the instructions associated with a first instruction stream.

25. The method of claim 21, further comprising:

establishing a time unit quanta in a timing circuit compatible with a first device operating at a first core frequency and compatible with a second device operating at a second core frequency, the first core frequency being different that the second core frequency.

26. The method of claim 21, further comprising:

establishing a time unit quanta in a timing circuit compatible with a first device operating at first frequency and compatible with the first device operating at a second frequency.

27. A system, comprising:

a central processing unit;

a graphics device, the central processing unit coupled to the graphics device, the graphics device containing a graphics-rendering engine to concurrently render two or more independent images for display on multiple display devices, and a time allocator to arbitrate the use of the graphics-rendering engine between the two or more independent images, wherein the time allocator comprises a first circuit to track the period of elapsed time that a particular register uses the graphics-rendering engine, and a second circuit to convert the programmable elapsed period of time into an equivalent number of clock cycles.

28. The system of claim 27, wherein the time allocator comprises:

a plurality of registers including a first register, the first register having a plurality of fields, a first field to determine whether the first register participates in an arbitration process to use the graphics rendering engine, a second field to point to a memory location containing instructions from a first instruction stream.

29. The system of claim 28, wherein the time allocator further comprises:

a first module containing the time allocator to establish a programmable elapsed period of time to use the graphics-rendering engine.

30. An apparatus, comprising:

a graphics-rendering engine to concurrently render two or more independent images for display on multiple display devices; and a time allocator to arbitrate the use of the graphics-rendering engine between the implement a software instruction from a graphics application, the software instruction to yield time allotted for instructions associated with a first independent image to use the graphics-rendering engine over to instructions associated with a second independent image.

31. An apparatus, comprising:

a graphics-rendering engine to concurrently render two or more independent images for display on multiple display devices; and a time allocator to arbitrate the use of the graphics-rendering engine between the two or more independent images one or more instruction transports to deliver instructions for the two or more independent images to the graphics-rendering engine, the one or more instruction transports including a first instruction transport that comprises an instruction memory area;

a first register to define a start and an end to the instruction memory area; and a memory access engine to fetch and deliver the instructions from the instruction memory area to the graphics-rendering engine.

* * * * *

UNITED STATES PATENT AND TRADEMARK OFFICE
CERTIFICATE OF CORRECTION

PATENT NO. : 6,885,374 B2  
DATED : April 26, 2005  
INVENTOR(S) : Doyle et al.

It is certified that error appears in the above-identified patent and that said Letters Patent is hereby corrected as shown below:

Column 14,
Line 45, delete "far" and insert -- for --.

Column 15,
Line 59, after "associated" insert -- with a --.

Column 18,
Line 16, after "the" insert -- two or more independent images, wherein the time allocator comprises a first circuit to --.

Signed and Sealed this

Ninth Day of August, 2005

JON W. DUDAS
*Director of the United States Patent and Trademark Office*